United States Patent
Fotland et al.

(10) Patent No.: US 7,308,686 B1
(45) Date of Patent: Dec. 11, 2007

(54) SOFTWARE INPUT/OUTPUT USING HARD REAL TIME THREADS

(75) Inventors: David A. Fotland, San Jose, CA (US); Nicholas J. Kelsey, Sunnyvale, CA (US)

(73) Assignee: Ubicom Inc., Mountain View, CA (US)

( * ) Notice: Subject to any disclaimer, the term of this patent is extended or adjusted under 35 U.S.C. 154(b) by 858 days.

(21) Appl. No.: 10/360,128

(22) Filed: Feb. 7, 2003

Related U.S. Application Data

(63) Continuation-in-part of application No. 09/888,296, filed on Jun. 22, 2001, now Pat. No. 7,120,783, which is a continuation-in-part of application No. 09/748,098, filed on Dec. 21, 2000.

(60) Provisional application No. 60/250,781, filed on Dec. 1, 2000, provisional application No. 60/213,745, filed on Jun. 22, 2000, provisional application No. 60/171,731, filed on Dec. 22, 1999.

(51) Int. Cl.
*G06F 9/46* (2006.01)
*G06F 1/04* (2006.01)
*G06F 7/38* (2006.01)

(52) U.S. Cl. ............... 718/102; 713/600; 712/228
(58) Field of Classification Search ............... 718/102; 712/207, 23, 228; 713/600
See application file for complete search history.

(56) References Cited

U.S. PATENT DOCUMENTS

| | | |
|---|---|---|
| 4,110,831 A | 8/1978 | Langdon, Jr. |
| 4,777,587 A | 10/1988 | Case et al. |
| 4,821,187 A | 4/1989 | Ueda et al. |
| 4,825,355 A | 4/1989 | Kurakazu et al. |
| 4,939,735 A | 7/1990 | Fredericks et al. |
| 5,163,146 A | 11/1992 | Antanaitis, Jr. et al. |
| 5,179,672 A * | 1/1993 | Genduso et al. ............ 713/600 |
| 5,247,636 A | 9/1993 | Minnick et al. |
| 5,260,703 A | 11/1993 | Nguyen et al. |
| 5,317,701 A * | 5/1994 | Reininger et al. .......... 712/207 |
| 5,361,337 A | 11/1994 | Okin |
| 5,392,435 A | 2/1995 | Masui et al. |
| 5,404,469 A | 4/1995 | Chung et al. |
| 5,410,658 A | 4/1995 | Sawase et al. |
| 5,430,884 A | 7/1995 | Beard et al. |
| 5,515,538 A | 5/1996 | Kleiman |
| 5,524,250 A | 6/1996 | Chesson et al. |

(Continued)

FOREIGN PATENT DOCUMENTS

WO WO 99/54813 10/1999

OTHER PUBLICATIONS

Nemirovsky, Dr. Mario Daniel; Brewer, Dr. Forrest; and Wood, Dr. Roger C.; DISC: Dynamic Instruction Stream Computer; 1991; ACM; pp. 163-171.

(Continued)

*Primary Examiner*—Meng-Al T. An
*Assistant Examiner*—Camquy Truong
(74) *Attorney, Agent, or Firm*—Fenwick & West LLP

(57) ABSTRACT

A system and method for implementing high speed input and output protocols in software using hard real time threads. The processor provides both high speed and deterministic performance. The hard real time threads execute enough instructions per clock cycle of the input and output protocol to regularly transfer data.

23 Claims, 15 Drawing Sheets

U.S. PATENT DOCUMENTS

| | | | |
|---|---|---|---|
| 5,553,305 | A | 9/1996 | Gregor et al. |
| 5,655,133 | A * | 8/1997 | Dupree et al. ............... 712/23 |
| 5,727,211 | A | 3/1998 | Gulsen |
| 5,761,470 | A | 6/1998 | Yoshida |
| 5,865,624 | A | 2/1999 | Hayashigawa |
| 5,867,725 | A | 2/1999 | Fung et al. |
| 5,907,694 | A | 5/1999 | Suzuki et al. |
| 5,933,627 | A | 8/1999 | Parady |
| 5,933,650 | A | 8/1999 | van Hook et al. |
| 5,944,816 | A | 8/1999 | Dutton et al. |
| 6,009,505 | A | 12/1999 | Thayer et al. |
| 6,016,542 | A | 1/2000 | Gottlieb et al. |
| 6,026,503 | A | 2/2000 | Gutgold et al. |
| 6,061,710 | A | 5/2000 | Eickemeyer et al. |
| 6,076,157 | A | 6/2000 | Borkenhagen et al. |
| 6,085,215 | A | 7/2000 | Ramakrishnan et al. |
| 6,163,839 | A | 12/2000 | Janik et al. |
| 6,314,511 | B2 | 11/2001 | Levy et al. |
| 6,317,774 | B1 | 11/2001 | Jones et al. |
| 6,366,998 | B1 | 4/2002 | Mohamed |
| 6,378,018 | B1 | 4/2002 | Tsern et al. |
| 6,385,713 | B2 | 5/2002 | Yung |
| 6,421,701 | B1 * | 7/2002 | Elnozahy ................... 718/100 |
| 6,460,116 | B1 | 10/2002 | Mahalingaiah |
| 6,493,741 | B1 | 12/2002 | Emer et al. |
| 6,542,991 | B1 | 4/2003 | Joy et al. |
| 6,567,839 | B1 | 5/2003 | Borkenhagen et al. |
| 6,718,360 | B1 | 4/2004 | Jones et al. |
| 6,728,722 | B1 | 4/2004 | Shaylor |
| 6,766,515 | B1 | 7/2004 | Bitar et al. |
| 2003/0037228 | A1 | 2/2003 | Kelsey et al. |
| 2003/0110344 | A1 | 6/2003 | Szczepanek et al. |
| 2004/0087839 | A1 * | 5/2004 | Raymond et al. ........... 600/300 |

OTHER PUBLICATIONS

Schwan, Karsten and Zhou, Hongyi: Dynamic Scheduling Of Hard Real-Time Tasks And Real-Time Threads: IEEE Transactions On Software Engineering: vol. 18, No. 8; Aug. 1992; pp. 736-748.

Intel Corporation, Pentium Processor Family Developer's Manual, vol. 3: Architecture and Programming Manual, 1995, pp. 25-1 and 25-30.

El-Kharashi, et al., Multithreaded Processors: The Upcoming Generation for Multimedia Chips, 1998 IEEE Symposium on Advances in Digital Filtering and Signal Processing, Jun. 5-6, 1998, pp. 111-115.

Eggers, Susan, Simultaneous Multithreading: A Platform For Next-Generation Prcessors, IEEE Micro, Sep./Oct. 1997, pp. 12-19, 0272/1732/97.

Binns, P. "A Robust High-Performance Time Partitioning Algorithm: The Digital Engine Operating System (DEOS) Approach," 2001, pp. 1.B.6-1.B.6-12.

8-bit AVR® Microcontroller with 128 K Bytes In-System Programmable Flash—Atmega103/103L—Preliminary; ATMEL; © Atmel Corporation 2000; pp. 1-126.

Lindsay, S.K. et al., "On the Performance of a Multi-Threaded RISC Architecture," Electrical and Computer Engineering, Sep. 1993, pp. 369-372, vol. 1.

Notification of Transmittal of the International Search Report, PCT/US00/35242, Apr. 27, 2001, 4 pages.

Supplementary European Search Report, EP 00989474, Nov. 23, 2004, 3 pages.

Gschwind, M. et al., "High Frequency Pipeline Architecture Using the Recirculation Buffer," IBM Research Report, IBM Research Division, Mar. 19, 2001, pp. 1-24.

"Clock Signal," Wikipedia, the free encyclopedia, May 9, 2007. pp. 1-2, [online] Retrieved from the Internet<en.wikipedia.org/wiki/Clock_signal>.

Shaaban, "Clock Signals & Synchronous Sequential Circuits," Jan. 9, 2002, p. 5.

* cited by examiner

ENTRY SCHEDULE TABLE

| A |
| B |
| A |
| C |
| A |
| B |
| A |
| * |

| A | B | A | C | A | B | A | * | A | B | ... SEQUENCE IS REPEATED

FIG. 3C

SOFTWARE INPUT/OUTPUT USING HARD REAL TIME THREADS

RELATED APPLICATIONS

This application is a continuation-in-part of U.S. patent application Ser. No. 09/888,296 filed on Jun. 22, 2001, now U.S. Pat. No. 7,120,783, which is a continuation-in-part of co-pending U.S. patent application Ser. No. 09/748,098 filed on Dec. 21, 2000, which claims priority from U.S. provisional application No. 60/250,781 filed on Dec. 1, 2000, U.S. provisional application No. 60/213,745 filed on Jun. 22, 2000, and U.S. provisional application No. 60/171,731 filed on Dec. 22, 1999, which are all incorporated by reference herein in their entirety. This application claims priority to all of the above identified applications.

BACKGROUND OF THE INVENTION

1. Field of the Invention

The invention relates to the field of multithreaded central processing units (CPUs) and more particularly to using hard real time threads for software implementations of high speed input and output protocols.

2. Description of Background Art

Many functions traditionally performed by hardware can be performed instead by software. A software implementation of a hardware function is called a virtual peripheral. Virtual peripherals are advantageous because they provide flexibility and breadth of functionality for a processor without requiring additional hardware components. One type of virtual peripheral is software implementation of input and output (I/O) protocols. In addition to providing the advantage of flexibility, software implementation of I/O protocols saves significant die space that would otherwise be used by a hardware implementation of the I/O protocol.

Software implementation of low speed I/O protocols has been performed in the past. Such low speed protocols have been limited to performance of less than 200 kbps. However, it is desirable to also allow software implementation of high speed I/O protocols, such as a peripheral component interconnect (PCI) I/O protocol at approximately 100 Mbps, or a Utopia I/O protocol at approximately 8 Mbps. Such software implementations of high speed I/O protocols require processors with both high speed and deterministic performance.

In the past, embedded processors have been used to implement low speed I/O protocols. An embedded processor is a processor that is used for specific functions. However, conventional embedded processors do not have the speed required to implement high speed I/O protocols.

Other conventional non-embedded processors, such as MIPS and ARM processors, are faster than conventional embedded processors. However, high speed I/O protocols demand timing within certain parameters, and limited jitter. Conventional non-embedded processors are unable to provide deterministic timing performance. Thus, conventional non-embedded processors are not able to support proper operation of virtual peripherals implementing high speed I/O protocols.

What is needed is a system and method that allows proper operation of a virtual peripheral for high speed I/O, such as PCI I/O and Utopia I/O. Such a system and method: (1) provides deterministic timing performance; and (2) allows I/O speeds of more than 200 kbps.

SUMMARY OF THE INVENTION

The invention is a system and method for implementing high speed input and output protocols in software. The high speed input and output protocols are implemented in software on a multithreaded processor that provides deterministic performance for the timing of the execution of instructions on the processor. In one embodiment, the processor is an embedded processor. In some embodiments, the processor has in varying combinations a nonstalling instruction pipeline, an on chip memory in which the operating system for the processor is stored, and a memory to memory instruction set.

A clock for the input and output protocol is generated, either in hardware or software. A set number of instructions in the hard real time thread is executed during every cycle of the input and output protocol clock. In some embodiments, the set number of instructions is sufficient to transfer data every input and output protocol clock cycle.

In one embodiment, a PCI I/O protocol is implemented in software with a hard real time thread. The PCI clock is generated in hardware. There are six instructions of the hard real time thread per PCI clock cycle. The PCI I/O hard real time thread may read data during the first three instructions, and write data during the last three instructions. When an external device initiates the data transfer, six instructions per cycle are sufficient so that the hard real time thread transfers data every PCI clock cycle. When the data transfer is internally initiated, additional instructions are used, so the hard real time thread transfers data every other PCI clock cycle.

In another embodiment, a Utopia I/O protocol is implemented in software with a hard real time thread. The hard real time thread generates the Utopia clock in software. When the Utopia clock is low, the hard real time thread transmits data, and when the Utopia clock is high, the hard real time thread receives data. Ten instructions are sufficient to allow transmission or reception of data. Thus, there are twenty instructions of the hard real time thread per Utopia clock cycle; ten instructions of the hard real time thread are executed when the Utopia clock is high, and ten instructions of the hard real time thread are executed when the Utopia clock is low.

In one embodiment, the Utopia hard real time thread runs two state machines, a transmit state machine when the clock is low and a receive state machine when the clock is high. Thus, as the Utopia clock transitions between low and high, the state machine being executed by the hard real time thread switches. Each state machine has multiple states, and each state has multiple code blocks that end with a jump to a different state of the other state machine. The multiple code blocks allow this embodiment to efficiently switch to the correct state of the different state machines.

BRIEF DESCRIPTION OF THE DRAWINGS

FIGS. 3a through 3c are illustrations of how hard real time threads are scheduled.

DETAILED DESCRIPTION OF THE PREFERRED EMBODIMENTS

A preferred embodiment of the present invention is now described with reference to the figures where like reference numbers indicate identical or functionally similar elements. Also in the figures, the left most digit(s) of each reference number corresponds to the figure in which the reference number is first used.

The present invention is a system and method that solves the above-identified problem. Specifically, the present invention uses hard-real-time (HRT) threads on an improved embedded processor to enable the use of a virtual peripheral for high speed I/O.

The text below first describes a processor on which it is possible to implement a virtual peripheral for high speed I/O. Following that are descriptions of how two specific high speed I/O virtual peripherals are implemented on such a processor.

Figure 1:
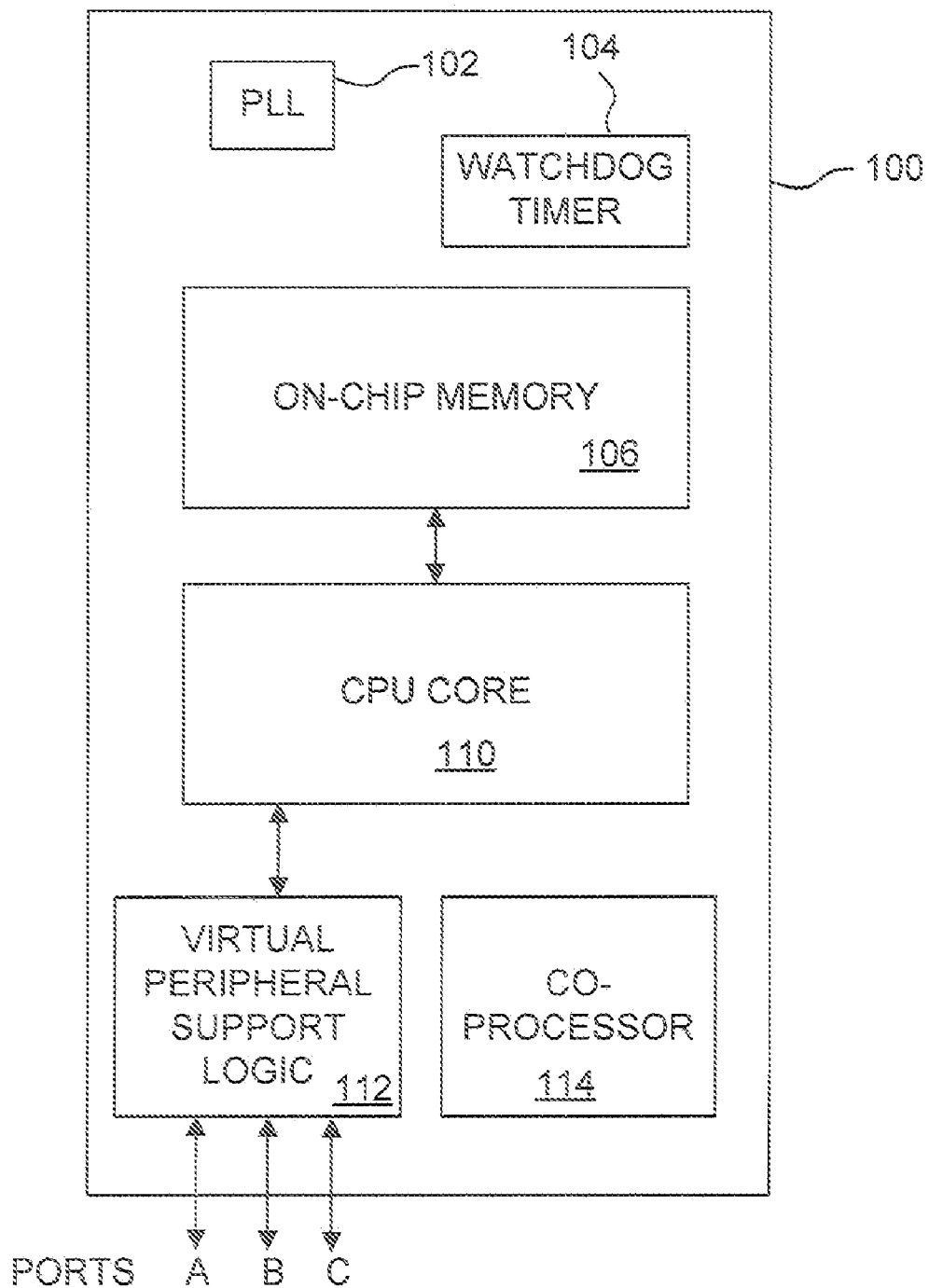
FIG. 1 is an illustration of one embodiment of a processor on which high speed software I/O be implemented.

Processor with Hard-Real-Time Threads:

FIG. 1 is an illustration of one embodiment of a processor 100 on which high speed software I/O according to the present invention can be implemented. The processor 100 performs multithreading, and can support both HRT threads and non-real-time (NRT) threads, both of which are further explained below.

The processor 100 illustrated in FIG. 1 is an embedded processor 100, and can include peripheral blocks, such as a phase locked loop (PLL) 102, or a watchdog timer 104. The embedded processor 100 also includes an on chip memory 106. The memory 106 stores the operating system, applications, and data. Since the processor 100 is an embedded processor with specific functions, the operating system is small enough to fit in the on-chip memory 106, and does not need to be stored in off-chip memory. This greatly speeds operation of the embedded processor 100. Operating system information need not be retrieved from off chip memory and cached locally. Rather, the operating system information is stored in the on chip memory 106, which obviates need for such a time consuming retrieval and caching operation. Further, since the processor 100 allows use of virtual peripherals for high speed I/O instead of requiring hardware I/O, there is more room on the chip for more memory 106, which can help to enable enough memory for storage of the operating system, applications, and data The embedded processor 100 also includes a CPU core 110, input/output (IO) support logic called virtual peripheral support logic 112, and a math coprocessor 114.

The processor 100 may also include a nonstalling pipeline. Such a nonstalling pipeline ensures the deterministic performance of the processor 100. One embodiment of the nonstalling pipeline is described in patent application Ser. No. 10/350,149, entitled, "Recirculating and Nonstalling Computer Processor Pipeline," by David A. Fotland, filed Jan. 22, 2003, which is incorporated by reference.

The processor 100 includes support for running multiple software threads and automatically switching between threads. This multi-threading support includes a variety of features including real-time and non-real-time task scheduling, inter-task communication with binary and counting semaphores (interrupts), fast interrupt response and context switching, and incremental linking. The multithreading aspect of the present invention takes place largely in the CPU 110 where the multiple thread contexts and thread selection logic reside. In addition, in some embodiments the multithreading might also exist in a coprocessor or DSP core which is on the same chip. One embodiment of such a multithreading processor 100 is further described in patent application Ser. No. 09/888,296 filed Jun. 22, 2001 which is incorporated by reference.

One consequence of using such multithreading is that dynamic branch prediction is not required. With conventional processors without multithreading, if a branch prediction error occurs and is discovered four clock cycles later, the entire pipeline is flushed, and all processing done in those four clock cycles is wasted. However, with the multithreading processor 100, since the multiple threads are interleaved in the pipeline, most or all of the processing done in those four clock cycles was performed on other threads unaffected by the branch prediction error. Only the thread with the branch prediction error is discarded; the entire pipeline is not flushed. This means static branch prediction can be used, while still providing adequate performance. Use of static branch prediction rather than dynamic branch prediction preserves the deterministic performance of the processor 100.

The processor 100 may also use a memory to memory instruction set. If such an instruction set is used, it reduces the number of instructions required for software implementation of high speed I/O protocols, and further speeds up the function of such software implementations. One embodiment of such a memory to memory instruction set is described in patent application Ser. No. 09/888,295 filed on Jun. 22, 2001, which is incorporated by reference.

Figure 2:
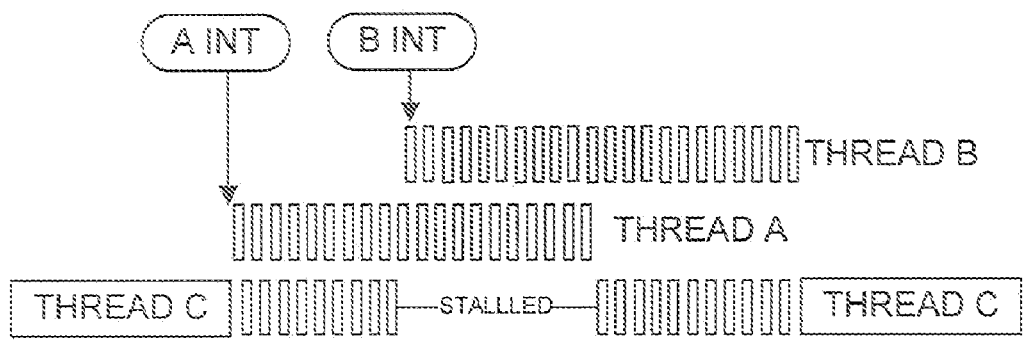
FIG. 2 is an illustration of an interrupt response in a multithreaded environment.

FIG. 2 is an illustration of an interrupt response in a multithreaded environment such as the embedded processor described above. Threads A and B are both hard-real-time (HRT) threads which have suspended pending interrupts A and B respectively. Thread C is the main code thread and is non-real-time (NRT). When interrupt A occurs, thread A is resumed and will interleave with thread C. Thread C no longer has the full pipeline throughput since it is NRT. When interrupt B occurs thread B is resumed, and, being of the same priority as thread A, will interleave down the pipeline, thread C is now completely stalled. The NRT main code, thread C, will continue executing only when the HRT threads are no longer using all of the pipeline throughput. In a typical application, each software I/O is assigned a dedicated HRT thread. When there is an event on the I/O pins, that HRT thread starts execution immediately, with a throughput guaranteed by the deterministic performance of the processor. The system can switch threads every clock cycle. A detailed description of the allocation and scheduling is described in U.S. patent application Ser. No. 09/748,098, which is incorporated by reference.

Figure 3A:
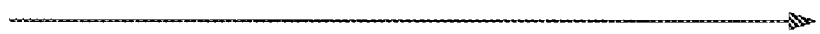
Figure 3B:
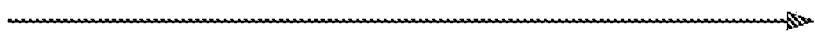

The allocation of the available processing time among the available threads is performed by a scheduling algorithm. In one embodiment of the present invention, a benefit occurs when the allocation of clock cycles to threads is done according to a fixed schedule. This scheduling can be broken into three classes: strict scheduling, semi-flexible scheduling and loose scheduling. FIG. 3a is an illustration of a strict scheduling example. FIGS. 3b and 3c are illustrations of semi-flexible scheduling examples. Loose scheduling, without HRT thread scheduling is also possible.

With reference to FIG. 3a, when the scheduler utilizes strict scheduling the schedule is fixed and does not change over short periods of time. For example if the schedule is programmed to be "ABAC" as illustrated in FIG. 3a then the runtime sequence of threads will "ABACABACABAC . . . " as illustrated in FIG. 3a. Threads that are strictly scheduled are called hard-real-time (HRT) threads because the number of instructions executed per second is exact and so an HRT thread is capable of deterministic performance that can satisfy hard timing requirements, such as the requirements of software implementation of high speed I/O.

With reference to FIG. 3b, when the scheduler utilizes a semi-flexible scheduling technique some of the schedule is fixed and the rest of the available instructions are filled with non-real time (NRT) threads. For example, if the schedule is programmed to be "A*B*" where "*" is a wildcard and can run any NRT thread, the runtime sequence of threads, with threads D, E and F being NRT threads, could be "ADBEAF-BEAFBE . . . " as illustrated in FIG. 3b.

An HRT thread will only execute when the fixed schedule specifies that thread. An NRT thread can be included in the fixed schedule. Such an NRT thread will execute during its fixed scheduled slots, and can also execute during the remaining flexible slots.

Some of the benefits of using either strict scheduling or semi-flexible scheduling is that the allocation of execution time for each HRT thread is set and therefore the time required to execute each thread is predictable. Such predictability is important for many threads since the thread may be required to complete execution within a specific time period. In contrast, interrupt service routines (ISRs) in conventional systems do not ensure that hard real time threads will be completed in a predictable time period when there are multiple interrupts. This occurs, for example, in conventional systems in which an ISR for a second interrupt does not begin until an ISR for a first interrupt is completed.

The static and semi-flexible schedule for hard real-time threads is achieved using a programmable instruction cycle table. Each entry in the table represents an available instruction cycle and identifies the hard-real-time thread to which that cycle is allocated. The table is of variable length, e.g., up to 64 entries. When the end of the table is reached the scheduler continues from the first element in the table thus providing an infinitely repeating sequence. For example, FIG. 3c is an illustration of a semi-flexible thread schedule using three hard-read time threads. Thread A is scheduled 50% of the time, thread B is scheduled 25% of the time and thread C is scheduled 12.5% of the time. The remaining 12.5% is allocated to processing non-real time threads. If the CPU is clocked at 200 MHz this would equate to thread A having a dedicated CPU execution rate of 100 MIPS, thread B having a dedicated CPU execution rate of 50 MIPS, thread C having a dedicated CPU execution rate of 25 MIPS and the remaining threads, e.g., non-real time threads, having a minimum CPU execution rate of 25 MIPS.

Accordingly, in static and semi-flexible schedules, each hard-real time thread is guaranteed particular execution rate because they are allocated instruction slots as specified in the table, thus they each have guaranteed deterministic performance. The predictability afforded by this significantly increases the efficiency of programs since the time required to execute hard-real time threads is known and the programs do not need to allocate extra time to ensure the completion of the thread. That is, the interrupt latency for each hard-real-time thread is deterministic within the resolution of its static allocation. The latency is determined by the pipeline length and the time until the thread is next scheduled. The added scheduling jitter can be considered to be the same as an asynchronous interrupt synchronizing with a synchronous clock. For example, a thread with 25% allocation will have a deterministic interrupt latency with respect to a clock running at 25% of the system clock. This deterministic performance allows software implementation of high speed I/O protocols.

Figure 4:
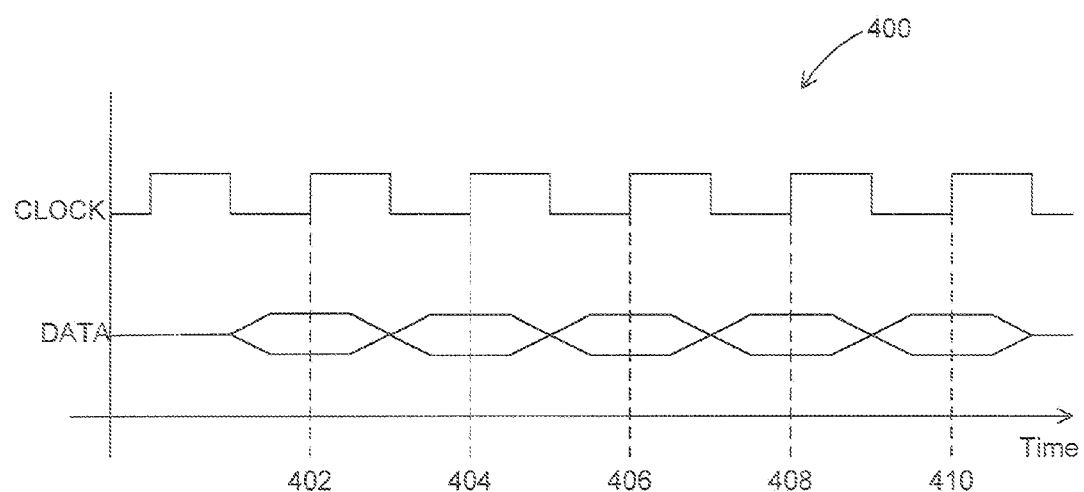
FIG. 4 is a timing diagram illustrating the timing of data transfer in an example high speed I/O protocol.

High Speed Data Transfer Overview:

FIG. 4 is a timing diagram 400 illustrating the timing of data transfer in an example high speed I/O protocol. The topmost signal in FIG. 4 is a clock signal. Beneath the clock signal is a data signal that shows when data is available for transfer. In the example of FIG. 4, the data is synchronized with the clock, and is available for a short time around the rising edge of each clock signal. The data is transferred at the rising edge of the clock signals, at transfer times 402, 404, 406, 408, and 410. If the timing of the transmitter or receiver is too far out of phase with the transfer times 402-410, the data will not be correctly transferred.

Thus, the virtual peripheral of the present invention outputs (if transmitting) or reads (if receiving) the data at the proper times. The processor on which the virtual peripheral runs ensures the proper timing through the use of hard-real-time (HRT) threads.

First Example Embodiment of Software Implementation of High Speed I/O

Figure 5:
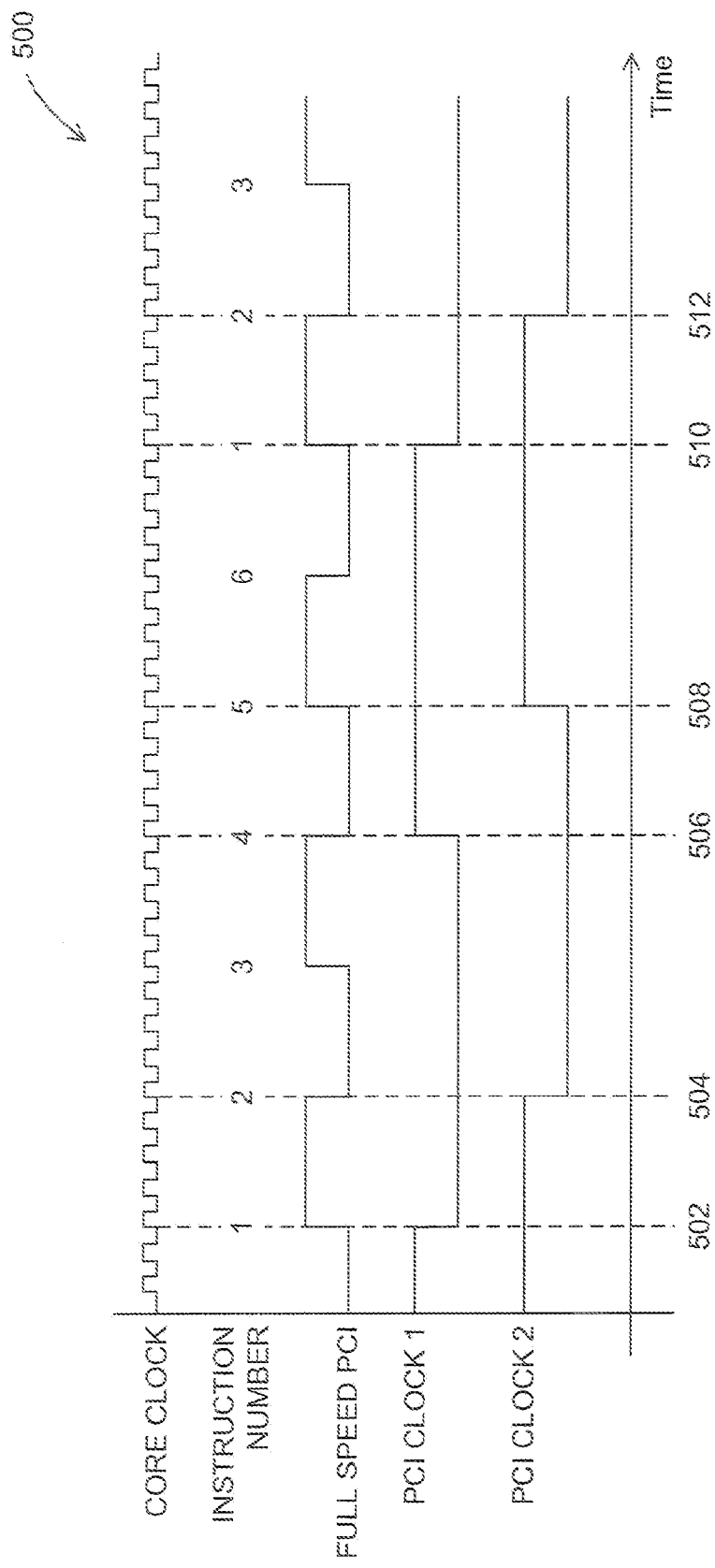
FIG. 5 is a timing diagram illustrating the timing of several different events of the software implementation of a PCI I/O protocol.

In one embodiment of the present invention, HRT threads are used in a software implementation of a peripheral component interconnect (PCI) I/O protocol. FIG. 5 is a timing diagram 500 illustrating the timing of several different events of the software implementation of the PCI I/O protocol. Topmost in the timing diagram 500 is the core clock signal of the processor 100. Beneath the core clock signal are numbers indicating the timing of the execution of instructions used by the virtual peripheral PCI HRT thread. Beneath the timing of the instructions is an approximately full speed PCI clock signal. Finally, the bottom two signals show two possible timings for the PCI clock signal used by the HRT thread in one embodiment that does not run at the full speed possible for a PCI clock.

The processor 100 has a 240 MHz core clock. The PCI protocol allows clocks of up to 33 MHz. However, one embodiment described below of the software PCI bus is implemented with a 10 MHz PCI clock. This means there is one PCI clock cycle for every 24 core clock cycles. The software thread running the PCI virtual peripheral is a HRT thread run at a 25% schedule. Thus, the PCI virtual peripheral runs one instruction for every four core clock cycles.

This results in six instructions for the PCI virtual peripheral for every PCI clock cycle. Six instructions per PCI clock cycle are sufficient to implement the described embodiment of the PCI protocol in software. In other embodiments, the processor may run at different speeds, and different PCI clock speeds, and different HRT schedules may be used.

The deterministic performance of the processor ensures that there will be six instructions per PCI clock cycle. If a processor without deterministic performance were used, the number of instructions per PCI clock cycle could vary, and the timing of the instructions during the PCI clock cycle could also vary.

In one preferred embodiment, the PCI clock signal is generated using a programmable clock divider from the core clock signal, rather than being generated in software by the PCI HRT thread virtual peripheral. This allows the software implementation of the PCI I/O protocol to suspend itself, then continue when the PCI I/O is needed. It also lowers the instruction count over the use of a software PCI clock signal generation. If the PCI clock signal were generated in software, the software PCI HRT thread would constantly run to provide the PCI clock signal, and two instructions of every PCI clock cycle would be used to set the PCI clock signal high and low.

The PCI instruction timing is adjusted by sampling the PCI clock signal on consecutive instructions to find the rising edge of the PCI clock signal, then arbitrarily numbering the instructions on either side of the rising edge of the PCI clock signal as instructions 4 and 5. Since the rising edge of the PCI clock signal is found by sampling the PCI clock signal on consecutive instructions, the exact timing of the rising edge of the PCI clock signal is not known—only that it occurs some time between instructions 4 and 5. Jitter may further obscure the exact timing of the rising edge of the PCI clock signal. Thus, the possible timing of the rising edge of the PCI clock signal may be considered to be simultaneously with instruction 4 or 5, as well as between instructions 4 and 5. PCI Clock1 in FIG. 5 illustrates the earliest point at which the rising edge of the PCI clock signal may occur, with a rising edge of the PCI clock signal at time 506, approximately simultaneous with instruction number 4, and falling edges of the PCI clock signal at times 502 and 510, approximately simultaneous with instruction number 1. PCI Clock2 in FIG. 5 illustrates the latest point at which the rising edge of the PCI clock signal may occur, showing a rising edge of the PCI clock signal at time 508, approximately simultaneous with instruction number 5, and falling edges of the PCI clock signal at times 504 and 512, approximately simultaneous with instruction number 2.

Thus, FIG. 5 illustrates how the rising edge of the PCI clock signal may occur any time between instructions 4 and 5, between times 506 and 508, inclusive. FIG. 5 also illustrates that the falling edges of the PCI clock signal may occur any time between instructions 1 and 2, between times 502 and 504 (or 510 and 512), inclusive.

In one embodiment, the timing of the PCI clock signal is determined by reading the value of the clock divider that generates the PCI clock signal. Typically, the PCI clock timing is set between instructions 4 and 5 in this embodiment as well.

The PCI virtual peripheral performs only one of reading data and transmitting data in a PCI clock cycle; the PCI virtual peripheral does not perform both reading and transmitting data in the same PCI clock cycle. However, the PCI virtual peripheral may both read and write PCI control signals in the same PCI clock cycle.

Reception by PCI Virtual Peripheral:

When the PCI virtual peripheral is reading data transmitted by a transmitting device, the transmitting device drives the data on the rising edge of the PCI virtual peripheral's PCI clock signal. Thus, the transmitting device drives the data sometime between instructions 4 and 5, inclusive. Using the 10 MHz PCI clock signal of this embodiment, incoming data driven by the transmitting device is stable by two instructions after the PCI clock signal's rising edge. Since the rising edge of the PCI clock signal occurs simultaneously with instruction 5 at the latest, and incoming data is stable two instructions after the data is driven, the incoming data will be stable by instruction 1. Thus, starting at instruction 1, the incoming data can be read by the PCI virtual peripheral.

More data may be driven by the transmitting device at the next rising edge of the PCI clock signal, which can occur as early as instruction 4. After the transmitting device drives this next set of data, the PCI virtual peripheral will no longer be able to read the previous data. Therefore, the data should be read by the PCI virtual peripheral prior to instruction 4. Thus, since the data can be read starting at instruction 1, and should be read prior to instruction 4, the incoming data is read by the PCI virtual peripheral at instruction 1, 2, or 3.

The full speed PCI clock signal of FIG. 5 helps illustrate how it is determined that the incoming data is stable by instruction 1. Under the PCI protocol, data written to the bus on the rising PCI full speed clock signal edge is valid and can be read by the time the next rising PCI full speed clock edge occurs. While the PCI clock of the PCI virtual peripheral is slower than the full speed PCI clock, the data becomes valid on the bus just as quickly for the PCI virtual peripheral as for a full speed PCI peripheral. As shown in FIG. 5, during the time from one rising edge of the full speed PCI clock signal to the next, two instructions of the described embodiment of the virtual peripheral PCI protocol are executed. Thus, data written to the PCI bus will become valid within the time it takes the processor 100 to execute two instructions of the described embodiment of the PCI virtual peripheral, as stated above.

Other embodiments may have different PCI clock signal speeds and different numbers of PCI instructions per PCI clock cycle. In such other embodiments, the incoming data from the transmitting device may be stable after fewer or more PCI instructions after the rising edge of the PCI clock signal. The timing diagrams of the full speed PCI clock signal, the PCI virtual peripheral clock signal, and the timing of the instructions executed in such other embodiments can be used as shown in FIG. 5 to determine during which instructions the virtual peripheral may read data.

Transmission by PCI Virtual Peripheral:

When the PCI virtual peripheral is transmitting data to an external receiving device, the receiving device reads the data on the rising edge of the PCI clock signal. To PCI virtual peripheral should avoid driving data to the bus prior the rising edge of the PCI clock signal. The latest the old data will be read by the external receiving device is instruction 5, because that is the latest time the rising edge of the PCI clock signal will occur. Therefore, data should not be driven to the bus by the PCI virtual peripheral until instruction 6. The outgoing data pipeline is two instructions long. That is, outgoing data is written by the PCI virtual peripheral two instructions prior to first appearing on the data bus. Thus, to avoid data appearing on the bus prior to instruction 6, the virtual peripheral writes the data at instruction 4 at the earliest.

When the data appears on the bus, it may take as long as two instructions to become valid. The data should be valid by the rising edge of the PCI clock signal, which happens at the earliest at instruction 4. Thus, the data should appear on the bus by instruction 2 at the latest. Since the data pipeline is two instructions long, this means that the PCI virtual peripheral writes the data at instruction 6 at the latest. Therefore, the outgoing data is written by the virtual peripheral at instruction 4, 5, or 6.

PCI Virtual Peripheral Software:

As shown above, with a 10 MHz PCI clock signal and six instructions executed per PCI clock cycle, the PCI virtual peripheral may read data or control in the first three instructions, and write data or control in the last three instructions (although, as stated above, data is not both read and written in the same PCI clock cycle). Allowing data to be written or read during any one of three instructions, rather than in a single specified instruction eases the timing requirement and makes creation of appropriate software simpler.

In one embodiment, the software implementation of the PCI protocol has four phases: request grant (wake from suspension), address, data transfer, and termination (return to suspension). Since the software is suspended when it is not needed, it does not use instructions unless it is needed, leaving more processing power available for other uses. In the grant phase, an interrupt unsuspends the PCI software HRT thread. Also, the 10 MHz PCI clock signal is synchronized. During the address phase, the PCI HRT thread gets the address for the data.

In one embodiment, the data transfer phase transfers data using six instructions per PCI clock cycle. Data may be transferred every clock cycle or every other clock cycle. Four types of data transfers occur: an external device initiated read, an external device initiated write, an internally initiated read, and an internally initiated write.

Figure 6A:
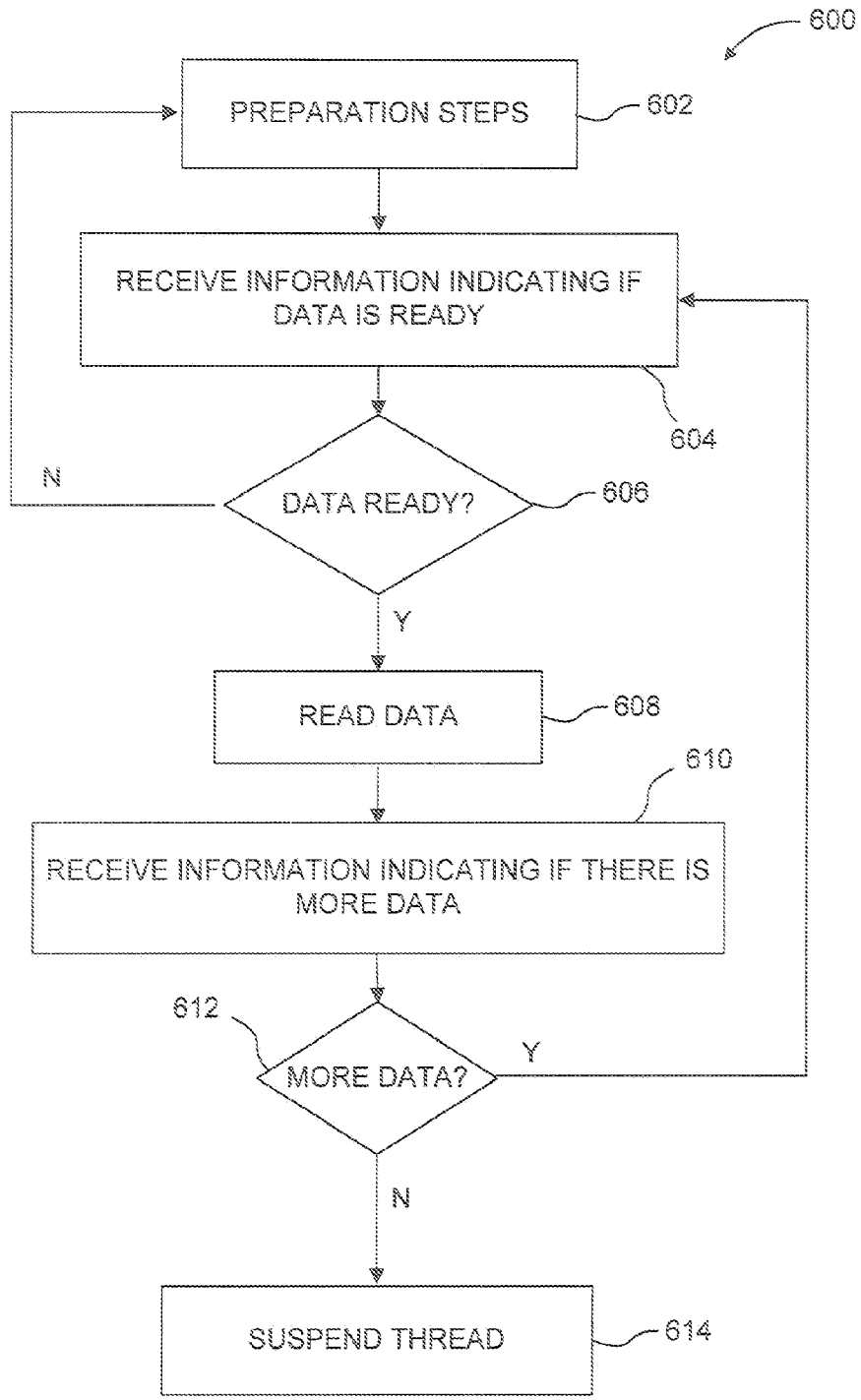
FIG. 6a is a flow chart illustrating how in an external device initiated read the data is read by the PCI I/O virtual peripheral every six instructions.

During the external device initiated read, data is received every PCI clock cycle, and thus every six instructions. FIG. 6a is a flow chart 600 illustrating how in an external device initiated read, data can be read by the PCI I/O virtual peripheral every six instructions in one preferred embodiment of the present invention.

Preparation steps 602 occur prior to the reading of the data. During the preparation steps 602, an interrupt is received and the PCI virtual peripheral HRT thread is unsuspended and initialized. The PCI clock signal is sampled, and the instructions are arbitrarily set so that the rising edge of the PCI clock signal occurs between instructions 4 and 5 of the PCI virtual peripheral HRT thread, as described above. The PCI virtual peripheral determines that the external device has initiated a read, so the processor 100 will execute the proper instructions for reading data in an external device initiated read.

The first instruction receives 604 information indicating whether the data is ready to be read off the bus. The second instruction tests 606 the received information to determine whether or not the data is ready to be read off the bus. If the data is not ready, the process returns to the preparation steps 602. If the data is ready, the process continues. In the third instruction, the data is read 608 off the bus. Note that, as described above, the PCI I/O virtual peripheral will function correctly if the data is read through execution of instruction 1, 2, or 3. Since the data read occurs through execution of instruction 3, the read operation of the PCI I/O virtual peripheral will function correctly. Also, the memory to memory instruction set allows the data to be read off the bus and into memory in a single instruction, rather than requiring multiple instructions. If multiple instructions were required, the PCI virtual peripheral would include more instructions per PCI clock cycle.

The fourth instruction receives 610 information indicating whether there is more data is to be received. The fifth instruction tests 612 the information received to determine whether or not there is more data to be received. If more data is to be received, the process returns to the first instruction, i.e., receiving 604 information indicating whether additional data is ready to be read off the bus. The process of returning to the first instruction carries a penalty of one instruction, which is the sixth instruction. Thus, six instructions are sufficient to implement a data read loop, and data can be read in every PCI clock cycle. If no more data is to be received, the thread suspends 614 itself.

Figure 7A:
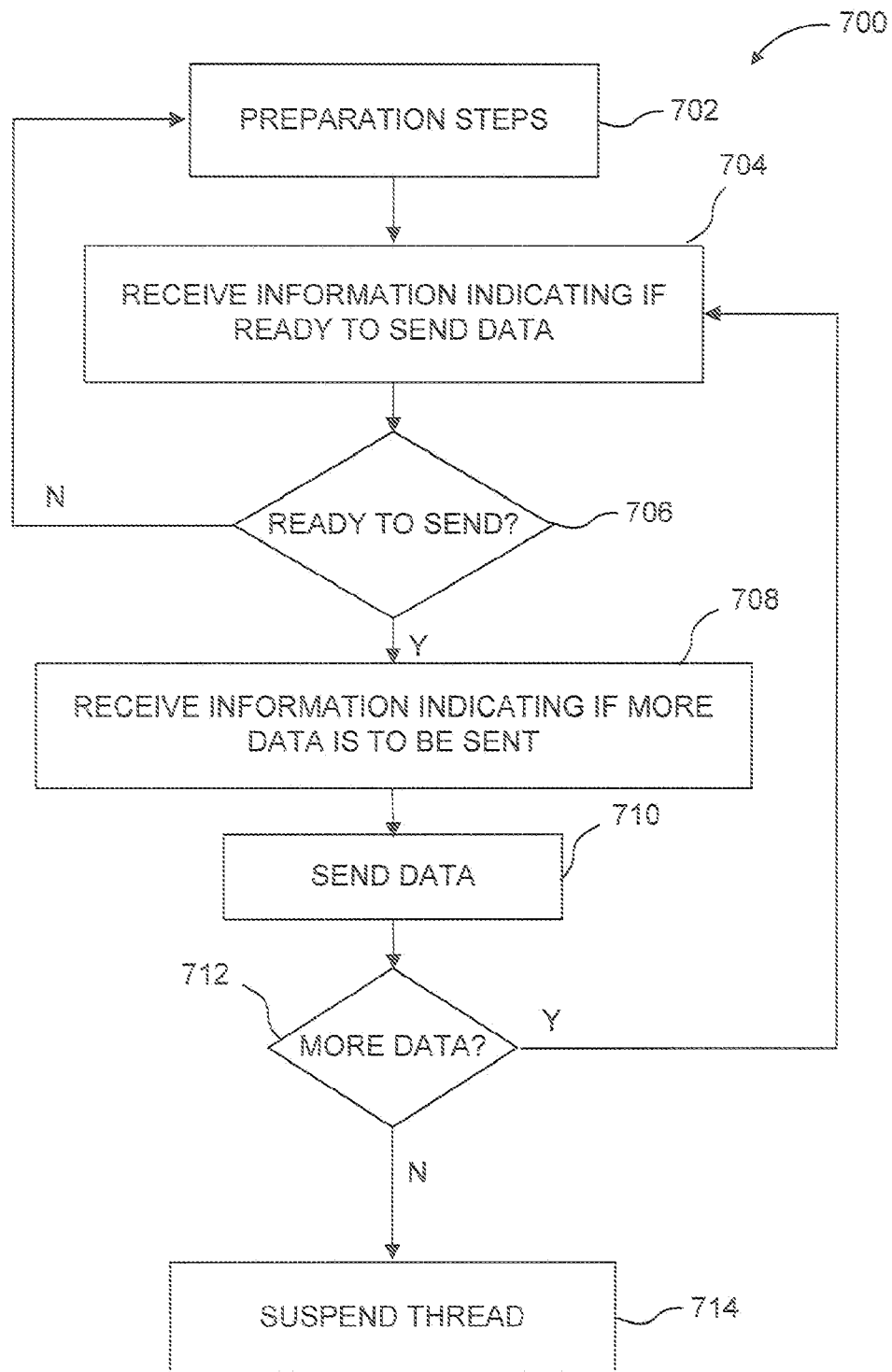
FIG. 7a is a flow chart illustrating how in an external device initiated write the data is written by the PCI I/O virtual peripheral every six instructions.

During the external device initiated write, data is sent every PCI clock cycle, that is, every six instructions. FIG. 7a is a flow chart 700 illustrating how in an external device initiated write the data is written by the PCI I/O virtual peripheral every six instructions in one preferred embodiment of the present invention.

Preparation steps 702 occur prior to the writing of the data. During the preparation steps 702, an interrupt is received and the PCI virtual peripheral HRT thread is unsuspended and initialized. The PCI clock signal is sampled, and the instructions are arbitrarily set so that the rising edge of the PCI clock signal occurs between instructions 4 and 5 of the PCI virtual peripheral HRT thread, as described above. The PCI virtual peripheral determines that the external device has initiated a write, so the processor 100 will execute the proper instructions for writing data in an external device initiated read.

The PCI control signal information is read during instructions 1, 2, or 3. The first instruction receives 704 information indicating whether the receiving device is ready for data to be sent. The second instruction tests 706 the received information to determine whether or not the receiving device is ready for data to be sent. If the receiving device is not ready, the process returns to the preparation steps 702. If the receiving device is ready, the process continues. The third instruction receives 708 information indicating whether the PCI I/O virtual peripheral has more data to be sent to the receiving device after the current data is sent.

The data is written 710 to the bus in the fourth instruction. Note that, as described above, the PCI I/O virtual peripheral will function correctly if the data is written during instruction 4, 5, or 6. Since the data write occurs during instruction 4, the write operation of the PCI I/O virtual peripheral will function correctly. Also, the memory to memory instruction set allows the data to be read off the memory and written onto the bus in a single instruction, rather than requiring multiple instructions. If multiple instructions were required, the PCI clock would include more instructions per PCI clock cycle.

The fifth instruction tests 712 the information indicating if the PCI I/O virtual peripheral is to write more data. If more data is not to be written to the bus, the thread suspends 714 itself. If more data is to be written, the process returns to the first instruction. The return process carries a penalty of one instruction, which is the sixth instruction. Thus, six instructions are sufficient to implement the data write loop, and data can be written in every PCI clock cycle.

As described above, six instructions are sufficient to implement a read or write operation that is externally initiated. However, when the read or write is an internally initiated read or write, the PCI I/O virtual peripheral additionally sets and clears the "initiator ready" signal, and tests for whether the external device has requested that the data transfer stop. This takes additional instructions, so instead of sending or receiving data every PCI clock cycle, the PCI I/O virtual peripheral sends or receives data every two PCI clock cycles. This allows the PCI I/O virtual peripheral twelve instructions, sufficient to read or write in addition to set the "initiator ready" signal, or test for whether the device has requested that the transfer stop.

Figure 6B:
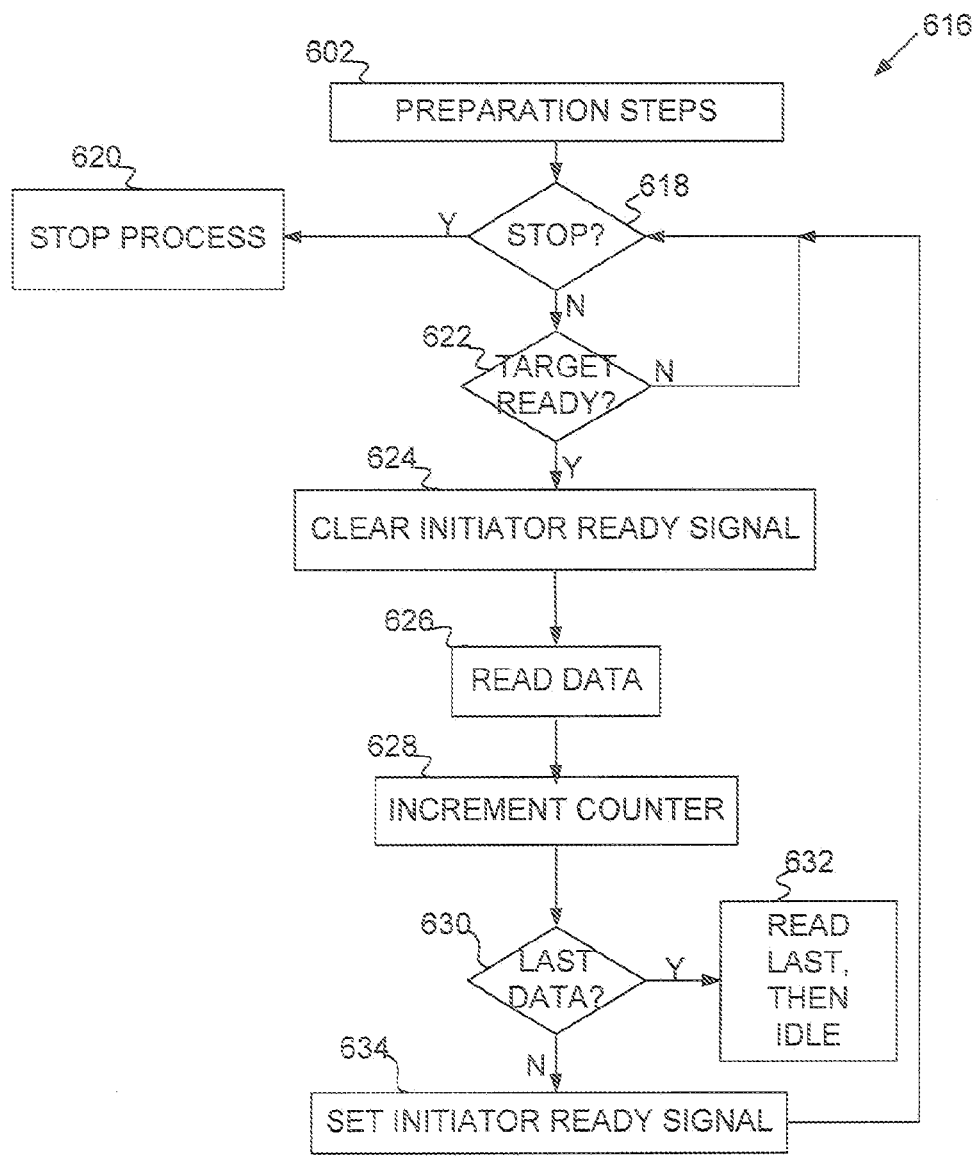
FIG. 6b is a flow chart illustrating an internally initiated read.

FIG. 6*b* is a flow chart 616 illustrating an internally initiated read. As with an external device initiated read, the preparation steps 602 occur prior to reading data. Next the PCI virtual peripheral determines 618 whether the external device has sent a "stop" signal to stop the transfer of data. This takes two instructions (instructions 1 and 2), one instruction to receive information indicating whether the external device wishes to stop the data transfer process and one instruction to test the received information. If the external device has sent a "stop" signal to stop the transfer of data, the process stops 620. If the external device has not sent a "stop" signal, the PCI virtual peripheral determines 622 whether the external device is ready. This takes two instructions (instructions 3 and 4), one instruction to receive information indicating whether the external device is ready and one instruction to test the received information. If the external device is not ready, the process returns to step 618. After a placeholder "no operation" instruction (instruction 5), the PCI virtual peripheral clears 624 the "initiator ready" signal (instruction 6).

Next, the PCI virtual peripheral reads 626 the data off the bus. This is the seventh instruction of the process. Since there are six instructions per PCI clock cycle, the seventh instruction of the process is also the first instruction of a PCI clock cycle, and the data is read through execution of instruction 1. Since the data read occurs during one of instructions 1, 2, and 3, the read operation of the PCI virtual peripheral functions correctly.

The PCI virtual peripheral increments 628 a counter (instruction 8). This counter keeps track of how many pieces of data have been read. Since the PCI virtual peripheral initiates the read operation, it has a set number of data pieces to be read. The PCI virtual peripheral keeps track of how many data pieces remain to be read through use of a counter. Next the PCI virtual peripheral determines 630 if the next data piece to be read from the bus is the last data piece to read. If so, the last data piece is read and the PCI HRT thread is terminated and suspended 632. This is done through a process that parallels steps 618-626, but the read data operation is followed by termination and suspension of the PCI HRT thread.

If the data piece to be read is not the last data piece, the "initiator ready" is set 634 (instruction 10). The process then returns to step 618, which uses instructions 11 and 12. Thus, in two PCI clock cycles and twelve instructions, one piece of data is read from the PCI bus.

Figure 7B:
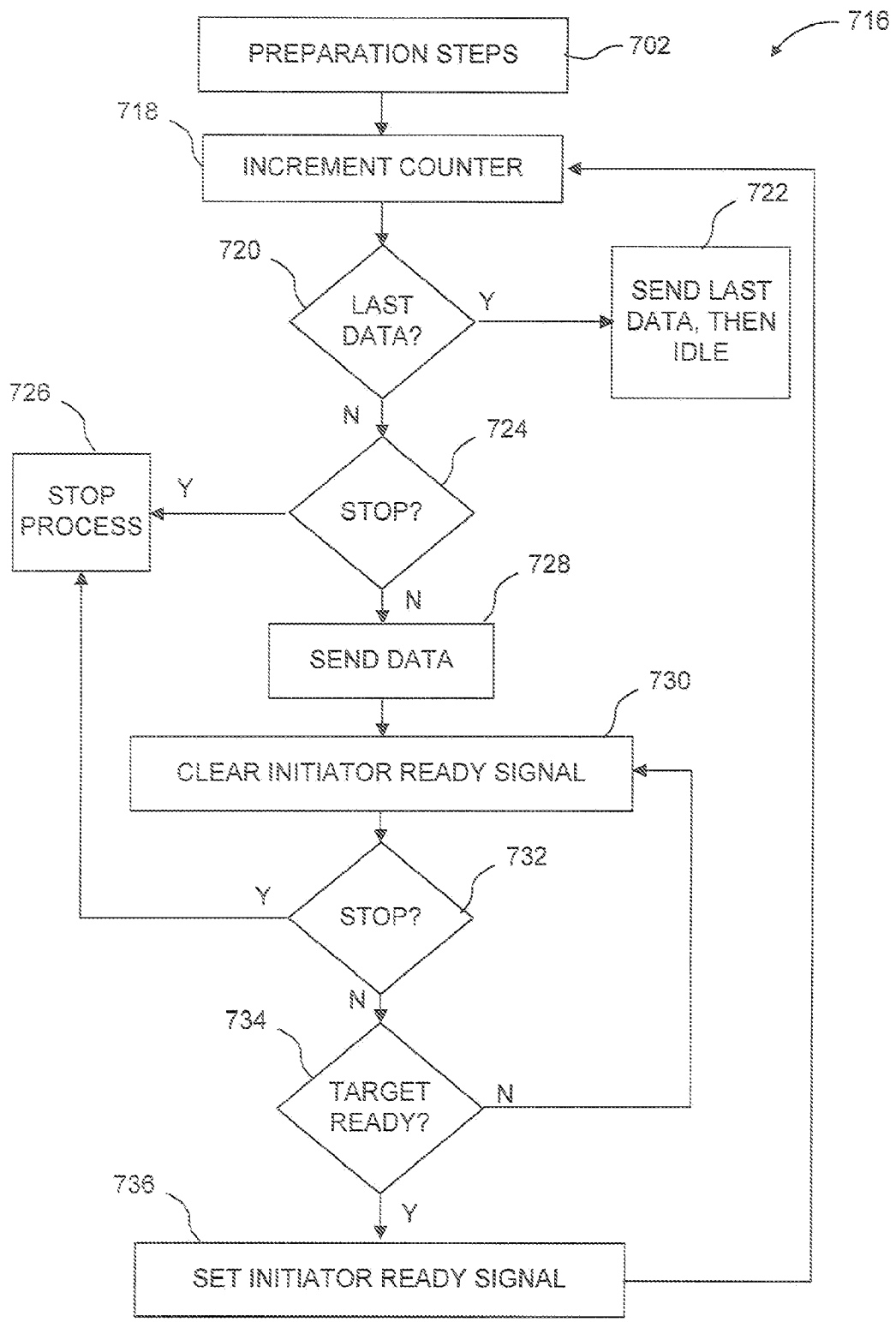
FIG. 7b is a flow chart illustrating an internally initiated write.

FIG. 7*b* is a flow chart 716 illustrating an internally initiated write. As with an external device initiated write, the preparation steps 702 occur prior to writing data to the bus. The PCI virtual peripheral increments 718 a counter (instruction 1). This counter keeps track of how many pieces of data have been written. Since the PCI virtual peripheral initiates the write operation, it has a set number of data pieces to write. The PCI virtual peripheral keeps track of how many data pieces remain to be written through use of a counter. Next the PCI virtual peripheral determines 720 if the next data piece to be written to the bus is the last data piece to be written. If so, the last data piece is written and the PCI HRT thread is terminated and suspended 722. The last data piece is written in one of the 4, 5, or 6 instructions, and a placeholder "no operation" instruction is used if necessary to delay the write instruction until one of the 4, 5, or 6 instructions.

If the next data piece to be written is not the last data piece, the PCI virtual peripheral determines 724 whether the external device has sent a "stop" signal to stop the transfer of data. This takes two instructions (instructions 3 and 4), one instruction to receive information indicating whether the external device wishes to stop the data transfer process and one instruction to test the received information. If the external device has sent a "stop" signal to stop the transfer of data, the process stops 726.

If the external device has not sent a "stop" signal, the PCI virtual peripheral writes 728 the data piece to the bus. This occurs at instruction 5. Since the PCI virtual peripheral will function correctly if the data is written during instruction 4, 5, or 6, writing the data piece to the bus during instruction 5 means the write operation of the PCI virtual peripheral will function correctly.

The PCI virtual peripheral then clears 730 the "initiator ready" signal (instruction 6). Then the PCI virtual peripheral determines 732 again whether the external device has sent a "stop" signal to stop the transfer of data. This takes two instructions (instructions 7 and 8), one instruction to receive information indicating whether the external device wishes to stop the data transfer process and one instruction to test the received information. If the external device has sent a "stop" signal to stop the transfer of data, the process stops 726.

If the external device has not sent a "stop" signal, the PCI virtual peripheral determines 734 if the external device is ready to receive the next data piece. This takes two instructions (instructions 9 and 10), one instruction to receive information indicating whether the external device is ready and one instruction to test the received information. If the external device is not ready, the process returns to the step of clearing 730 the "initiator ready" signal. If the external device is ready, the PCI virtual peripheral sets 736 the "initiator ready" signal, and returns to the step of incrementing 718 the counter. Setting 736 the "initiator ready" signal, and returning to the step of incrementing 718 the counter takes two instructions (instructions 11 and 12). Thus, in two PCI clock cycles and twelve instructions, one piece of data is written to the PCI bus.

Second Example Embodiment of Software Implementation of High Speed I/O

Figure 8:
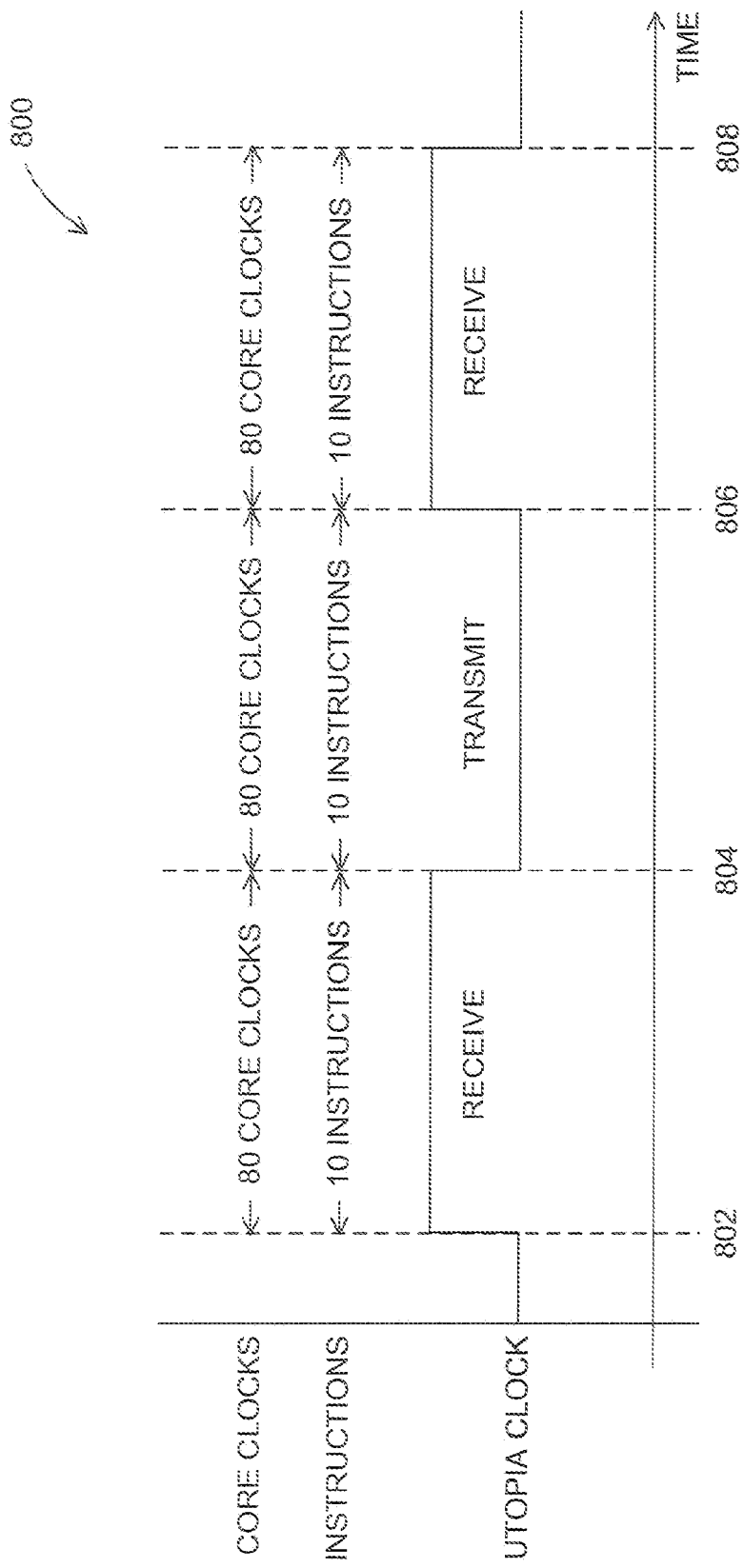
FIG. 8 is a timing diagram illustrating the timing relationships in a virtual peripheral Utopia protocol HRT thread.

In another embodiment of the present invention, HRT threads are used in a software implementation of a Utopia I/O protocol, rather than a PCI protocol. FIG. 8 is a timing diagram 800 illustrating the timing relationships between the processor core clock signal, the Utopia clock signal, the instructions executed by the virtual peripheral Utopia HRT thread, and when transmission and reception occurs for the Utopia HRT thread in this described embodiment. In one preferred embodiment, the processor has a 240 MHz core clock signal, and the software Utopia bus is implemented with a 1.5 MHz clock signal. The Utopia clock signal is generated with software, where a timer interrupt occurs every 80 core clock cycles. This timer interrupt causes the rising or falling edge of the Utopia clock signal. Thus, there is one full Utopia clock cycle for every 160 core clock cycles. The Utopia clock signal could also be generated with hardware.

The software thread running the Utopia virtual peripheral is an HRT thread run at a 12.5% schedule, i.e., the Utopia virtual peripheral runs one instruction for every eight core clock cycles. This results in twenty instructions for every Utopia clock cycle.

In the Utopia protocol, transmission occurs when the Utopia clock signal is at a low level, and reception occurs when the Utopia clock signal is at a high level. This means there are ten instructions available for data transmission, and ten instructions available for data reception. In other embodiments, the processor may run at different speeds, have different PCI clock speeds, and have different HRT schedules.

In one embodiment, since the Utopia protocol switches back and forth between transmission and reception, two state machines are used to implement the Utopia I/O protocol in software. One state machine is for transmission, which runs when the Utopia clock signal is at a low level, and one state machine is for reception, which runs when the Utopia clock signal is at a high level. The state machines include functionality to keep track of in which state the other machine is: the reception state machine includes functionality to keep track of the state of the state of the transmission state machine and the transmission state machine includes functionality to keep track of the state of the state of the reception state machine. This allows the Utopia I/O virtual peripheral to correctly alternate between the transmission state machine and the reception state machine and transmit or receive data every half Utopia clock cycle with a limited number of instructions available for execution every half Utopia clock cycle.

In the described embodiment, there are ten instructions available for the transmit or receive state machine before the Utopia I/O virtual peripheral switches from transmit to receive or receive to transmit. Each state machine has multiple states, each having a function. To complete the function prior to the Utopia I/O virtual peripheral clock edge, each state uses ten instructions (or fewer, with placeholder instructions filling the rest of the instruction slots) to perform its function. Thus, at the end of ten instructions, each state has completed its function and has determined whether to move to another state or remain in the same state. In one preferred embodiment, each state is implemented in software; each state implemented in software uses ten instructions or less to perform the function of that state.

Figure 9:
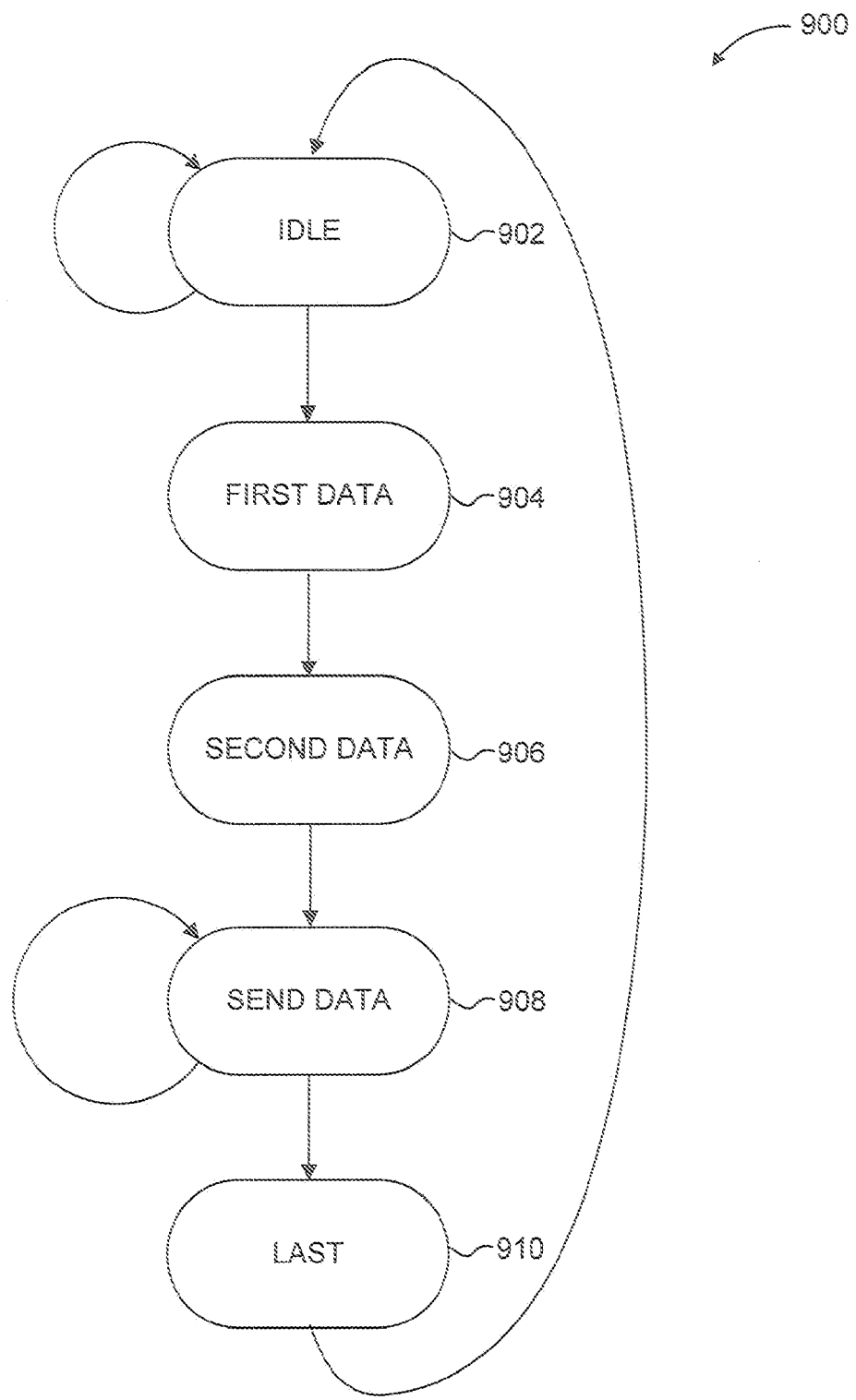
FIG. 9 is a block diagram of a transmit state machine of the Utopia protocol HRT thread.

FIG. 9 is a block diagram of the transmit state machine 900. When the transmit state machine 900 is in an idle state 902, it is not transmitting. When in the idle state 902, the processor 100 determines whether data is available to be transmitted and whether the target can receive data. If data is available, and the target is ready to receive data, the next state of the transmit state machine 900 is the first data state 904. If not, the transmit state machine 900 remains in the idle state 902.

In the first data state 904 the processor 100 prepares to send the first data piece and sends the first data piece. The processor 100 sets a transmission enabling signal (the "TxENB" signal) high to enable transmission. The processor 100 also sets a transmission signal (the "TxSOC" signal) high to indicate the presence of the first data piece on the data bus. Then, the first data piece is sent.

After the first data state 904, the next state is the second data state 906. The processor 100 sets the transmission signal (the "TxSOC" signal) low in the second data state 906, because the transmission signal indicates the presence of the first data piece on the data bus, and the first data piece has previously been sent. After setting the transmission signal low to indicate it is not the first data piece being sent, the processor 100 sends the second data piece.

After the second data state 906, the next state is the send data state 908. In the send data state 908, the processor sends a piece of data. The transmission signal has already been set high and then low in the first and second data states 904 and 906, so the send data state 908 does not require further setting of the transmission signal. The send data state 908 includes a counter so that the transmit state machine 900 remains in the send data state 908 until a predetermined number of data pieces are sent. In one embodiment, each of the data pieces sent in the first and second data states 904 and 906, and the send data state 908 are bytes, and the transmit state machine 900 remains in the send data state until fifty-one bytes of data are sent.

After the predetermined number of data pieces are sent, the next state is the last state 910. The last state 910 performs cleanup functions, such as setting the transmission enabling signal low to disable data transmission, and is followed by the idle state 902. As stated above, each state 902-910 performs its function within ten instructions.

Figure 10:
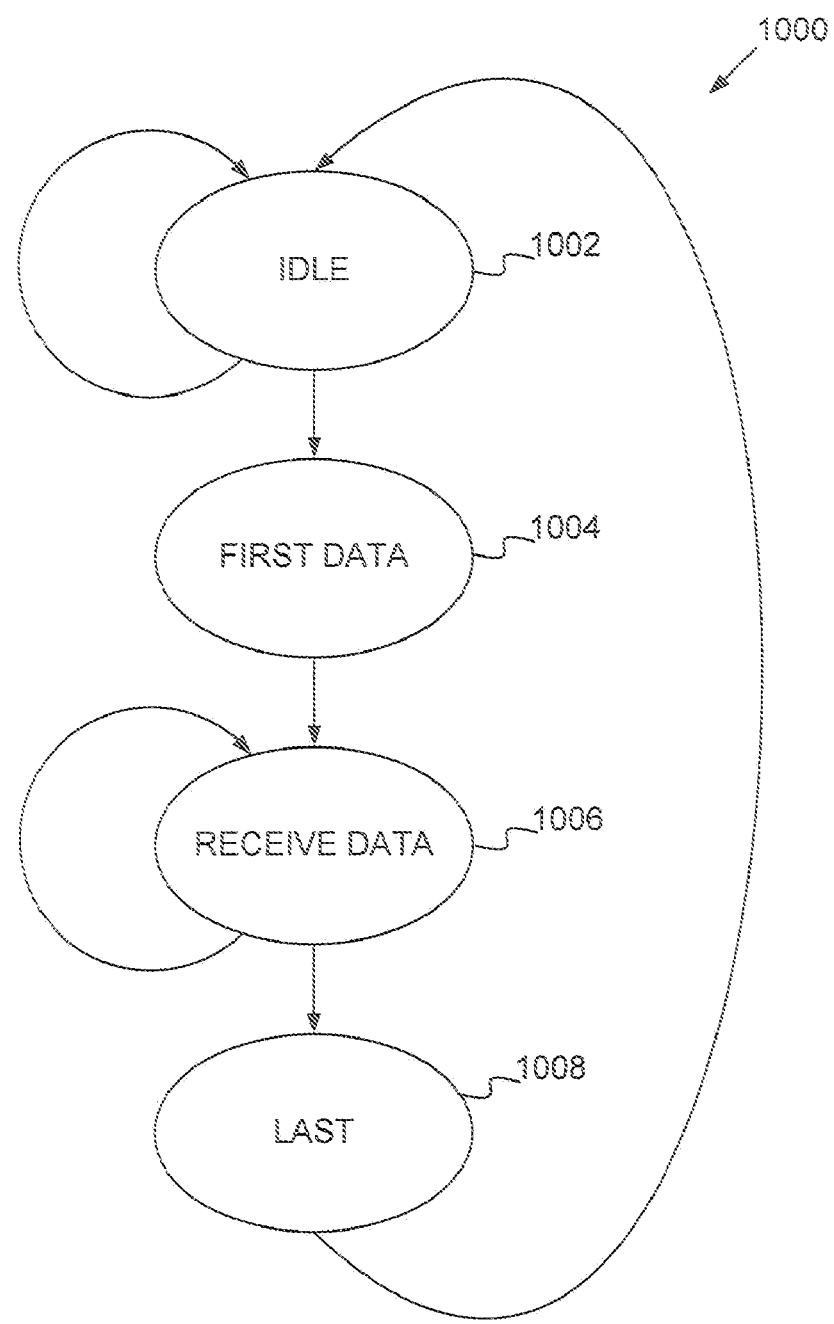
FIG. 10 is a block diagram of a receive state machine of the Utopia protocol HRT thread.

FIG. 10 is a block diagram of the receive state machine 1000. When the receive state machine 1000 is in an idle state 1002, it is not receiving data. In the idle state 1002 the processor 100 determines whether there is data to receive, in which case the next state of the receive state machine 1000 is the first data state 1004, or whether to continue to idle and wait for data to receive, in which case the receive state machine 1000 remains in the idle state 1002.

During the first data state 1004 the processor 100 determines where to store the data pieces received during the first data state 1004, the receive data state 1006, and the last state 1008. The first two data pieces are also received, and then stored in the determined storage location.

After the first data state 1004, the state machine 1000 transitions to the receive data state 1006. During the receive byte state 1006, a piece of data is received and stored. The receive data state 1006 includes a counter so that the receive state machine 1000 remains in the receive data state 1006 until a predetermined number of data pieces are received. In one embodiment, each of the data pieces sent in the first data state 1004 and the receive data state 1006 are bytes, and the receive state machine 1000 remains in the receive data state 1006 while forty-nine bytes of data are received. After the predetermined number of data pieces are received, the next state is the last state 1008. During the last state 1008 the processor 100 receives and stores the last data piece and performs cleanup functions, such as interrupting higher level programs to alert them that the received data is available. After the last state 1008, the receive state machine 1000 transitions to the idle state 1002. As described above, each state 1002-1008 performs its function within ten instructions.

The Utopia I/O virtual peripheral includes functionality that allows it to switch to the proper state when switching between transmit and receive state machines. For example, after performing the function of the transmit idle state 902, the Utopia I/O virtual peripheral switches to one of the four receive states 1002-1008. In one embodiment the Utopia I/O virtual peripheral switches into the correct state through use of multiple blocks of code for every state. Using the transmit state machine 900 as an example, each state 902-910 has four different blocks of code, each block of code corresponding to a different one of the four states 1002-1008 of the receive state machine 1000. Each different block of code for the same state 902-910 will cause the Utopia I/O virtual peripheral to switch to a different state within the receive state machine 1000.

In a conventional state machine, the state is encoded as a data value, and there are instructions to test the state variable and branch to the appropriate block of code. In contrast, in some embodiments of the present invention, the state values or the two state machines are jointly encoded in the program counter value of the block of code being executed. This requires the execution of fewer instructions to branch to the appropriate block of code.

Figure 11:
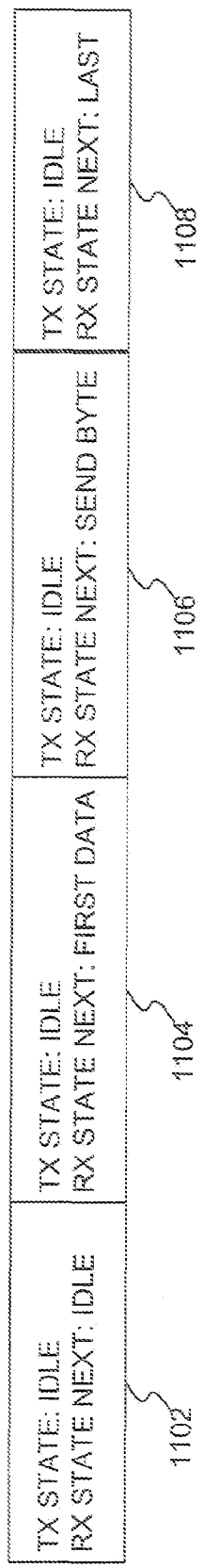
FIG. 11 is a block diagram illustrating the different code blocks for the transmit idle state of the Utopia protocol HRT thread.

FIG. 11 is a block diagram illustrating the different code blocks for the transmit idle state 902. There is one idle 902 block of code 1102 that causes the Utopia I/O virtual peripheral to switch to the receive idle state 1002. There is one idle 902 block of code 1104 that causes a switch to the first data state 1004, one idle 902 block 1106 that causes a switch to the send byte state 1006, and one idle 902 block 1108 that causes a switch to the last state 1008. Each of these blocks 1102-1108 performs the same transmit idle state 902 function. Each differs by causing the Utopia I/O virtual peripheral to switch to the corresponding receive state 1002-1008.

Each of the five transmit states 902-910 includes a different code block for each of the four receive states 1002-1008. Thus, there are twenty transmit state code blocks. Similarly, each of the four receive states 1002-1008 includes a different code block for each of the five transmit states 902-910, which means there are twenty receive code blocks. These code blocks allow the state machines to switch between transmit and receive and end up at the correct state for each state machine, without requiring the use of multiple instructions to test the state of each state machine. This allows each state to be implemented in only ten instructions.

Figure 12:
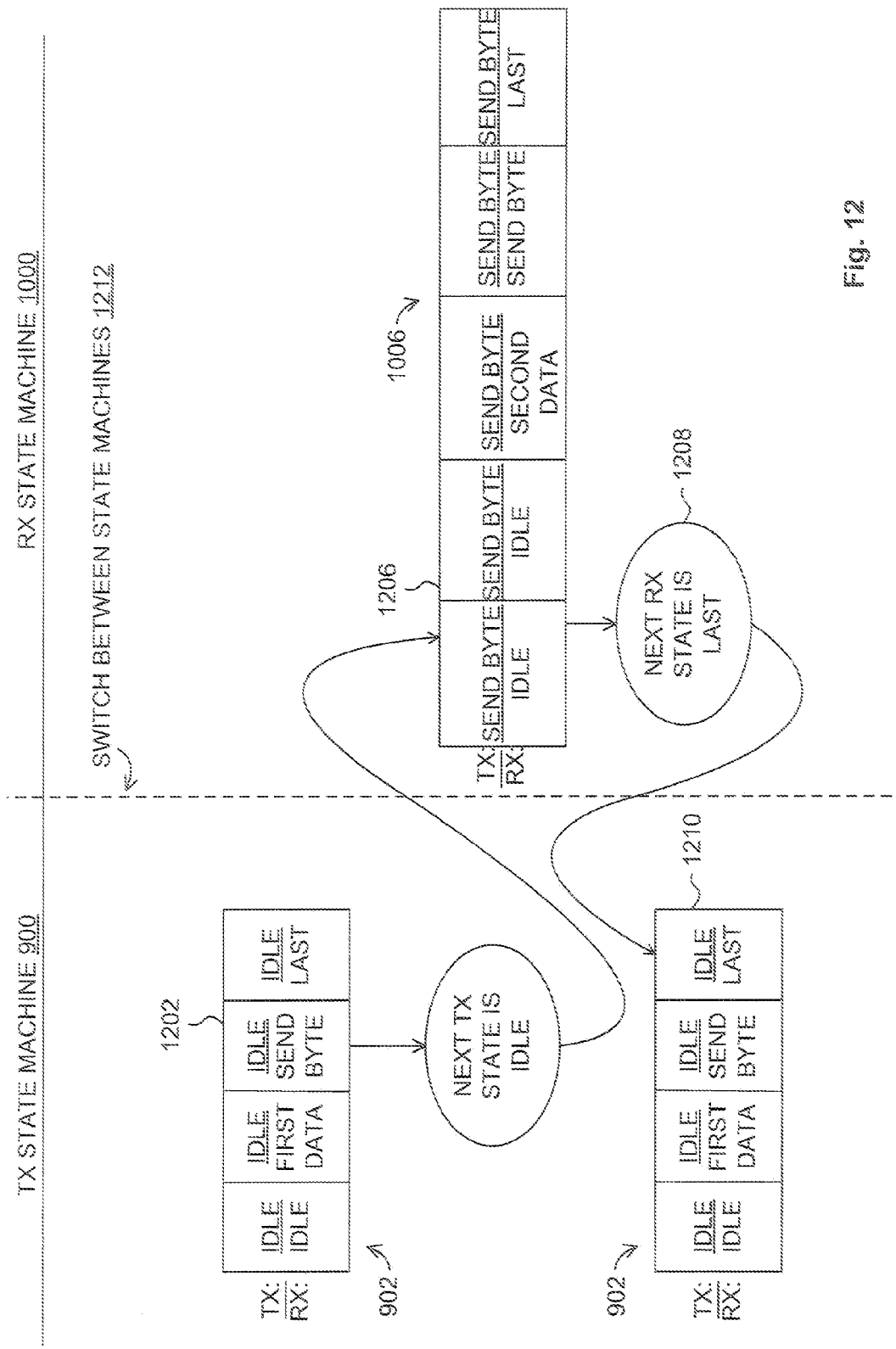
FIG. 12 is a block diagram that illustrates how the multiple code blocks function.

FIG. 12 is a block diagram that illustrates how the multiple code blocks function to cause the Utopia I/O virtual peripheral to correctly switch to the proper states of the two state machines 900, 1000. The transmit state machine 900 is on the left side of FIG. 12, and the receive state machine 1000 is on the right. Dashed line 1212 represents the switching between state machines that occurs on a clock edge. In the example shown in FIG. 12, the idle state 902 of the transmit state machine 900 is first being executed. There are four different code blocks for the idle state 902. The executed idle code block 1202 is the one that causes the send byte state 1006 of the receive state machine 1000 to be executed after the switch 1212 occurs. The idle state 902 determines 1204 that the next state of the transmit state machine 900 is again the idle state 902. Thus, when the Utopia I/O virtual peripheral switches 1212 from transmit to receive, the transmit idle state 902 causes the code block 1206 that will return the transmit idle state to be executed. Thus, the transmit idle state 902 causes code block 1206, one of the five receive state machine 1000 send byte state 1006 code blocks, to be executed. This will automatically cause the transmit state to be idle 902 when the Utopia I/O virtual peripheral next switches from receive to transmit.

Similarly, each of the code blocks of the receive send byte state 1006 performs the same send byte function. Each block differs in what transmit state will be entered after the next switch between transmit and receive state machines. In FIG. 12, the send byte state 1006 determines 1208 that the next receive state is the last state 1008. Thus, the receive send byte state 1006 causes code block 1210, one of the four transmit state machine 900 idle state 902 code blocks, to be executed. This will automatically cause the receive state to be last 1008 when the Utopia I/O virtual peripheral next switches from transmit to receive. Thus, by implementing several code blocks for each transmit and receive state, the Utopia I/O virtual peripheral switches to the correct state when it switches between transmit and receive, and does so without requiring the use of multiple instructions to test into what state it should switch.

While the invention has been particularly shown and described with reference to a preferred embodiment and several alternate embodiments, it will be understood by persons skilled in the relevant art that various changes in form and details can be made therein without departing from the spirit and scope of the invention.

What is claimed is:

1. A method for implementing a high speed input and output protocol in software as a hard real time thread on a multithreaded processor, comprising the steps of:
   scheduling instructions of the hard real time thread of the high speed input and output protocol to be executed as a predetermined fraction of all scheduled instructions on the multithreaded processor over a first time period;
   generating a schedule allocating cycles of an input and output protocol clock signal to a plurality of threads so instructions of the hard real time thread execute during cycles of the input and output protocol clock signal specified by the schedule;
   generating the input and output protocol clock signal, a selected number of the instructions of the hard real time thread being executed each cycle of the input and output protocol clock signal, each instruction of the selected number of instructions being executed at the same time for each cycle of the input and output protocol clock signal; and
   executing a first predetermined instruction of the selected number of the instructions at a first predetermined time within the cycle of the input and output protocol clock signal to transfer data.

2. The method of claim 1, wherein the execution of the first predetermined instruction of the selected number of the instructions transmits data and further comprising executing a second predetermined instruction of the selected number of instructions at a second predetermined time within the cycle of the clock to receive data.

3. The method of claim 1, wherein the high speed input and output protocol implemented in software has a data transfer speed greater than 200 kbps.

4. The method of claim 1, wherein the high speed input and output protocol implemented in software has a data transfer speed of at least approximately 8 Mbps.

5. The method of claim 1, wherein the high speed input and output protocol implemented in software has a data transfer speed of at least approximately 100 Mbps.

6. The method of claim 1, wherein the input and output protocol clock signal is generated with hardware.

7. The method of claim 1, further comprising the step of executing instructions to perform only one of transmitting data and receiving data in a single input and output protocol clock cycle.

8. The method of claim 1, wherein the selected number of instructions are sufficient to perform only one of transmitting data and receiving data in each of a plurality of consecutive input and output protocol clock cycles.

9. The method of claim 1, wherein the selected number of instructions are sufficient to perform only one of transmitting data and receiving data in every other of a plurality of consecutive input and output protocol clock cycles.

10. The method of claim 1, further comprising synchronizing the selected number of instructions to the generated clock so that execution of an instruction in the first half of the selected number of instructions operates to receive data, and execution of an instruction in the second half of the selected number of instructions operates to transmit data.

11. The method of claim 1, wherein the selected number of instructions are six.

12. The method of claim 1, further comprising:
receiving a request for the input and output protocol;
in response to receiving the request, executing instructions of the hard real time thread to wake the software implementation of the input and output protocol from suspension; and
in response to completing transfer of data, executing instructions to suspend the software implementation of the input and output protocol.

13. The method of claim 1, wherein the multithreaded processor comprises a memory to memory instruction set.

14. The method of claim 1, wherein the multithreaded processor comprises a nonstalling instruction pipeline.

15. The method of claim 1, wherein the multithreaded processor comprises an on chip memory that stores the operating system for the processor.

16. The method of claim 1, wherein the clock signal is generated by execution of at least one instruction of the selected number of the instructions.

17. The method of claim 1, further comprising the steps of:
executing instructions to transmit data while the generated input and output protocol clock signal is at a first level; and
executing instructions to receive data while the generated input and output protocol clock is at a second level.

18. The method of claim 17, further comprising the step of executing instructions to transmit and receive data in a single complete input and output protocol clock cycle.

19. The method of claim 17, wherein the selected number of instructions are sufficient to transmit and receive data during each of a plurality of consecutive input and output protocol clock cycles.

20. A method for implementing a high speed input and output protocol in software as a hard real time thread on a multithreaded processor, comprising the steps of:
scheduling instructions of the hard real time thread of the high speed input and output protocol to be executed as a predetermined fraction of all scheduled instructions on the multithreaded processor over a first time period;
generating an input and output protocol clock signal, a selected number of the instructions of the hard real time thread being executed each cycle of the input and output protocol clock signal, each instruction of the selected number of instructions being executed at the same time for each cycle of the input and output protocol clock signal;
executing a first predetermined instruction of the selected number of the instructions at a first predetermined time within the cycle of the input and output protocol clock signal to transfer data;
executing instructions to transmit data while the generated input and output protocol clock signal is at a first level; and
executing instructions to receive data while the generated input and output protocol clock is at a second level,
wherein the instructions to transmit data comprises a plurality of subsets of transmit instructions and the instructions to receive data comprises a plurality of subsets of receive instructions.

21. The method of claim 20, further comprising the steps of:
executing instructions of a first subset of transmit instructions to transmit data while the generated input and output protocol clock is in one state;
executing instructions of the first subset of transmit instructions to determine which subset of transmit instructions to execute during the next generated input and output protocol clock cycle;
executing at least one instruction of the first subset of transmit instructions to switch to a first subset of receive instructions; and
executing the first subset of receive instructions, including at least one instruction to switch to the determined subset of transmit instructions.

22. The method of claim 20, wherein each of the plurality of subsets of transmit instructions includes at least one instruction indicating which of the plurality of subsets of receive instructions to execute the next time the generated input and output protocol clock is at the second level.

23. The method of claim 20, wherein each of the plurality of subsets of receive instructions includes at least one instruction indicating which of the plurality of subsets of transmit instructions to execute the next time the generated input and output protocol clock is at the first level.

* * * * *